United States Patent [19]
Nishiyama et al.

[11] Patent Number: 5,765,673
[45] Date of Patent: Jun. 16, 1998

[54] ENGAGING APPARATUS

[75] Inventors: Hiroyuki Nishiyama; Fumikazu Takaoka; Kiyokazu Tanaka, all of Fuji, Japan

[73] Assignee: JATCO Corporation, Japan

[21] Appl. No.: 705,906

[22] Filed: Aug. 28, 1996

[30] Foreign Application Priority Data

Aug. 30, 1995  [JP]  Japan .................. 7-245457

[51] Int. Cl.$^6$ .................. F16D 25/0638; F16D 13/68
[52] U.S. Cl. .................. 192/85 AA; 192/70.17; 192/30 V; 188/71.5
[58] Field of Search .................. 192/70.17, 70.18, 192/70.2, 85 AA, 30 V, 207, 55.3; 188/71.5, 72.4, 73.37, 73.38

[56] References Cited

U.S. PATENT DOCUMENTS

| | | | |
|---|---|---|---|
| 1,467,732 | 9/1923 | Litle, Jr. .................. | 192/70.17 |
| 3,245,508 | 4/1966 | Livezey .................. | 192/70.2 X |
| 3,861,501 | 1/1975 | Brooks et al. .................. | 192/70.2 X |
| 4,673,065 | 6/1987 | Gerard et al. .................. | 188/73.38 |

FOREIGN PATENT DOCUMENTS

| 59-34026 | 2/1984 | Japan .................. | 192/30 V |
|---|---|---|---|

*Primary Examiner*—Richard M. Lorence
*Attorney, Agent, or Firm*—Rossi & Associates

[57] ABSTRACT

An engaging apparatus is provided that includes: outer and inner support members having respective splines that are opposed to each other in a radial direction thereof, and being rotatable relative to each other; a plurality of outer friction plates engaging with the spline of the outer support member; a plurality of inner friction plates alternately superposed on the outer friction plates and engaging with the spline of the inner support member; and a hydraulic piston mechanism for compressing a stack of the outer and inner friction plates. A spring member is inserted between circumferentially opposed faces of a driven set of the friction plates and a spline of the corresponding support member. The spring member is formed by bending an elastic material at an axially intermediate point thereof to have a long side and a short side with a circumferential spacing left therebetween. The long side supports the driven plates, and the end portion of the short side is supported by a side wall of the spline at a point that is approximately aligned with an axially middle portion of a region of said long side, which region supports the driven plates.

9 Claims, 4 Drawing Sheets

Fig. 4A
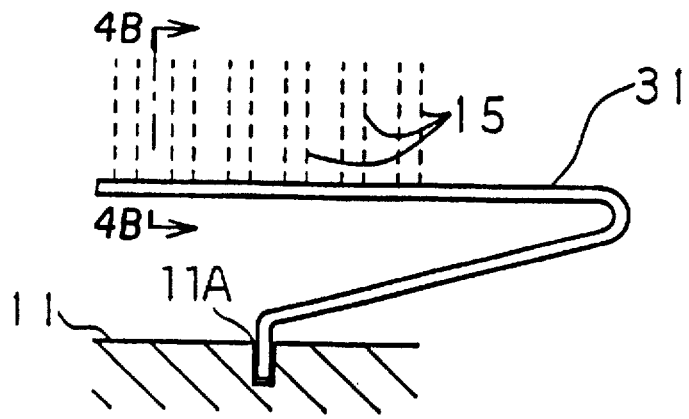
Fig. 4B
Fig. 5A
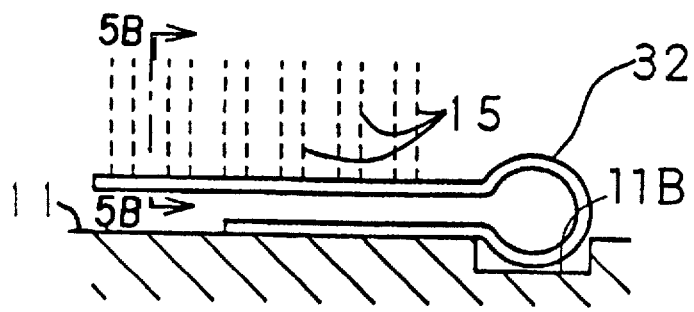
Fig. 5B
Fig. 6A
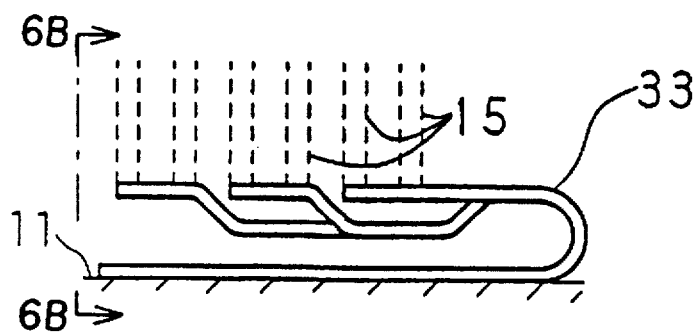
Fig. 6B
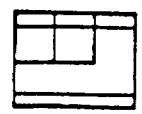

ENGAGING APPARATUS

BACKGROUND OF THE INVENTION

1. Field of the Invention

The present invention relates to an engaging apparatus incorporated in an automatic transmission, and more particularly to a structure for preventing vibration of friction plates in a multiple-plate engaging apparatus.

2. Description of the Prior Art

A multiple-plate type clutch or brake incorporated in an automatic transmission includes outer and inner support members that are rotatable relative to each other and have respective splines that are opposed to each other in the radial direction thereof, a plurality of outer friction plates engaging with the spline of the outer support member, a plurality of inner friction plates alternately superposed on the outer friction plates and engaging with the spline of the inner support member, and a hydraulic piston mechanism for compressing a stack of the outer and inner friction plates superposed on each other. The clutch or brake may further include a retaining member that is inhibited from moving in the axial direction relative to the spline of the corresponding support member, so as to receive compressive force applied to the friction plates.

When the compressive force applied to the friction plates is released so that the inner and outer support members are rotated relative to each other in the engaging apparatus as described above, noises may arise due to vibration of the friction plates caused by the relative rotation of the support members. In a brake in which the movement of the inner friction plates is restricted by the outer friction plates engaging with the spline formed in a case of the automatic transmission as the outer support member, in particular, the friction plates on the side of the transmission case may oscillate and collide with the inner wall of the case, thus causing large noises.

Japanese Patent Application Laid-open No. 2-46324 discloses a structure for preventing vibration of the friction plates when an engine brake is applied. In the disclosed structure, a spring member is provided in the bottom of the spline, for biasing the friction plates in the radial direction, so as to eliminate clearances between the friction plates and the transmission case, thereby to reduce oscillation or rattling of the friction plates.

In the structure for preventing the vibration of the friction plates, however, the spring member restricts movements of the friction plates in the radial direction, and thus the friction plates may be off-centered with respect to the center axis of the case. The spline formed in the case during a die-casting process are not expected to assure high dimensional accuracy. Further, the spline is tapered to facilitate removal of a mold in the axial direction, thus inevitably leaving large clearances between the friction plates and the spline.

If the friction plates are biased by the spring member in the radial direction in the above cases, the degree of eccentricity of the friction plates with respect to the center axis of the case is increased, causing a variation in the state of contact between the peripheral portions of the friction plates and the spline of the cases in the circumferential direction. This may result in damaging spline edges or teeth of the friction plates upon engagement thereof. Accordingly, the spline need to be formed with improved accuracy, by finishing side walls and bottom walls of the spline separately by cutting, for example.

In the structure disclosed in the above-indicated publication, a plurality of friction plates are biased by the same spring member formed by bending a thin-plate spring material into a simple shape. Therefore, some of the friction plates may not be biased by the spring member. Further, the friction plates that abut on the case on the side remote from the spring member as viewed in the radial direction may disturb further deformation of the spring member. This may allow the other friction plates that do not abut on the case to oscillate or rattle in the circumferential direction.

The assignee of the present application proposed in Japanese Patent Application No. 6-198038 a structure for preventing vibration of the friction plates in which a spring member is disposed between a side wall of the spline of the case and the friction plates, so as to eliminate clearances between the case and the friction plates in the circumferential direction. In this structure, the spring member is located at an upper, left angular position as viewed from the side on which the inner friction plates are rotated clockwise. Thus, the spring member is adapted to prevent the vibration of the friction plates in the same direction in which the outer and inner friction plates are rotated relative to each other, thereby effectively avoiding the vibration of the friction plates on the side of the case.

SUMMARY OF THE INVENTION

It is an object of the present invention to provide an engaging apparatus that utilizes a spring member as disclosed in Japanese Patent Application No. 6-198038 for biasing friction plates in the circumferential direction, so as to effectively prevent vibration of the friction plates without excessively off-centering the friction plates even if spline is formed in a case with poor accuracy.

An engaging apparatus constructed according to the present invention includes outer support member and inner support member having first and second splines, respectively, that are opposed to each other in a radial direction thereof, which outer and inner support members are rotatable relative to each other, a plurality of outer friction plates engaging with the first spline of the outer support member, a plurality of inner friction plates alternately superposed on the outer friction plates and engaging with the second spline of the inner support member, and a hydraulic piston mechanism for compressing a stack of the outer and inner friction plates that are superposed on each other. In this engaging apparatus, a spring member is inserted between circumferentially opposed faces of a driven set of the outer and inner friction plates and the spline of a corresponding one of the outer and inner support members. The spring member is formed by bending an elastic material at an axially intermediate point thereof with a circumferential spacing left between both sides of a bent portion thereof. With the spring member thus provided, side faces of teeth of the driven set of friction plates are pressed against a side wall of the spline of the corresponding support member, whereby the friction plates are not allowed to oscillate in the circumferential direction even if these friction plates are exposed to intermittent dragging force applied in the circumferential direction from the other (driving) set of the friction plates during relative rotation thereof. Thus, no noise arises due to the oscillation of the friction plates.

Since the spring member biases the friction plates in the circumferential direction, in particular, the friction plates are off-centered with respect to the center axis of the case by a smaller degree as compared with the case where the plates are biased in the radial direction. In this case, the friction plates and the spline of the case are in a uniform engaging condition over the entire circumference thereof even if large clearances are present between the friction plates and the walls of the spline. Further, the spring member is formed by bending the elastic material in the axial direction, whereby the stroke of the spring can be set to a larger value than that obtained where the spring member is bent in the circumferential direction. Consequently, the friction plates can be stably positioned by the bias force which does not vary so much due to expansion and contraction of the spring member, and are thus prevented from losing the function of centering themselves due to an excessive bias force.

The bent portion of the spring member is preferably located on the inner side of the spline toward which the spring member is inserted. This spring member is inserted through a large-width portion of the spline that is formed with a taper or draft, into the axially inner small-width side of the spline, such that the end portions of the spring member that is bent into a cuneate shape is located on the side of an opening of the spline. During the insertion, therefore, edges of the end portions of the spring member are not caught by the spline or other surrounding members. When the present apparatus is disassembled, the bias force applied to the friction plates can be temporarily released by reducing a distance between the opposite end portions of the spring member that are located on the side of the opening of the spline. The bent portion of the spring member, which is positioned on the inner side of the spline, does not interfere with other components located on the side of the opening of the spline.

Further, the bent portion of the spring member may be located on the inner side of the spline with respect to a support portion thereof that abuts on the driven set of the friction plates while the outer and inner friction plates are not in engagement with each other, as viewed in the direction in which the spring member is inserted into the spline. In this case, a distance between a point of biasing the friction plates and the bent portion is increased, whereby the friction plates can be stably biased by the spring member with a substantially constant bias force even if the point of biasing the fiction plates is displaced to a greater extent. The load burdens exerted on the bent portion due to expansion and contraction of the spring member in the circumferential direction.

On the opposite sides of the bent portion of the spring member, there may be formed a relatively long side against which the driven set of the outer and inner friction plates are pressed, and a relatively short side having an end portion supported by a side wall of the spline. The long side and the short side form an angle larger than zero degree when the spring member is in a free state. Since the end portion of the short side of the spring member is supported along a line or at a point by the side wall of the spline of the support member, the spring member is able to control its posture by itself to conform to a variation in the circumferential length among the plurality of the friction plates, irrespective of the inclination of the side walls of the spline. Namely, even if the side faces of teeth of the friction plates received in the spline do not extend in parallel with the axial direction of the spline due to the tapered side wall of the spline of the support member, for example, the spring member carries out self-alignment, that is, controls its posture by itself, using the end portion of the short side as the center of the self-alignment while bringing the long side into contact with the side faces of the teeth of the friction plates. This eliminates clearances or room for allowing vibration of the friction plates in the circumferential direction.

If the end portion of the short side of the spring member is bent inwards so as to form a curved surface that protrudes outwards in the above arrangement, an edge of the end portion of the short side does not contact or slide on the surface of the support member defining the spline, and the curved surface that protrudes outwards prevents the wall surface of the spline from being worn off or unnecessarily caught by the spring member, assuring smooth contact and support of the spring member.

When the hydraulic piston mechanism includes a retaining plate that is inhibited from moving relative to the spline of the support members in the axial direction so as to receive compressive force applied to the friction plates, the long side of the spring member may be formed with a distal end portion that is bent substantially squarely to protrude outwards, which distal end portion is located between the retaining plate and an opposed one of the friction plates. The protruding end porion of the long side of the spring member is received in a space corresponding to the thickness of the driving friction plate interposed between the retaining plate and the opposed driven friction plate, so as to position the spring member in the axial direction. In this case, the spring member is prevented from being deviated from its nominal position even if the spring member repeatedly expands and contracts in the circumferential direction, thus assuring high capability of preventing oscillations of the friction plates with high stability and reliability.

One of the teeth of each of the friction plates, which is located at the same angular position, may be formed with a smaller circumferential dimension than the other teeth, such that an axially continuous space for accommodating the spring member is formed between the short teeth of the friction plates and the corresponding spline of the support member. A difference in the width between the retaining plate and the short teeth of the friction plates restricts or inhibits axial movements of the spring member, and prevents the spring member from dropping off toward the retaining plate. This eliminates a need to provide the spring member with a structure for preventing dropping-off thereof, thus assuring increase freedom in designing and positioning the spring member. While the above-indicated space for accommodating the spring member may be formed by setting back the wall of the spline of the support member, it is easier to shorten the teeth of the friction plates than machining the support member.

The length of the short side of the spring member may be determined such that the short side terminates at a point that is approximately aligned with an axially middle portion of a support region of the long side on which the friction plates abut on while the outer and inner friction plates are not in engagement with each other. In this case, one and the other half of the friction plates are respectively located on one and the other of the axially opposite sides of the point at which the spring member is supported by the side wall of the spline of the support member, and the distance between the support point and one end of the stack of the friction plates is made substantially equal to that between the support point and the other end. Accordingly, all of the friction plates are biased by substantially the same force toward the side wall of the spline of the support member.

To form the above-indicated space for accommodating the spring member, at least one of the opposed faces of the friction plates and the spline is retracted or set back by an amount that is determined to be equal to or larger than a radius of a circle defining the bent portion of the spring member. In this case, the spring member is safely protected within the space and prevented from being damaged or permanently deformed, even if the friction plates are biased in such a direction that causes the spring member to be crushed or contracted. Further, the spring member provides a sufficiently large stroke of expansion and contraction in the circumferential direction, thereby applying stable biasing force to all of the friction plates to effectively prevent the oscillation of the friction plates.

BRIEF DESCRIPTION OF THE DRAWINGS

FIGS. 4A through 6B are views showing modified examples of a spring member. FIG. 4B is a cross sectional view along with a line A—A in FIG. 4A. FIG. 5B is a cross sectional view along with a line B—B in FIG. 5A, and FIG. 6B is an end view in a direction C—C in FIG. 6A.

DETAILED DESCRIPTION OF THE PREFERRED EMBODIMENT

Figure 1:
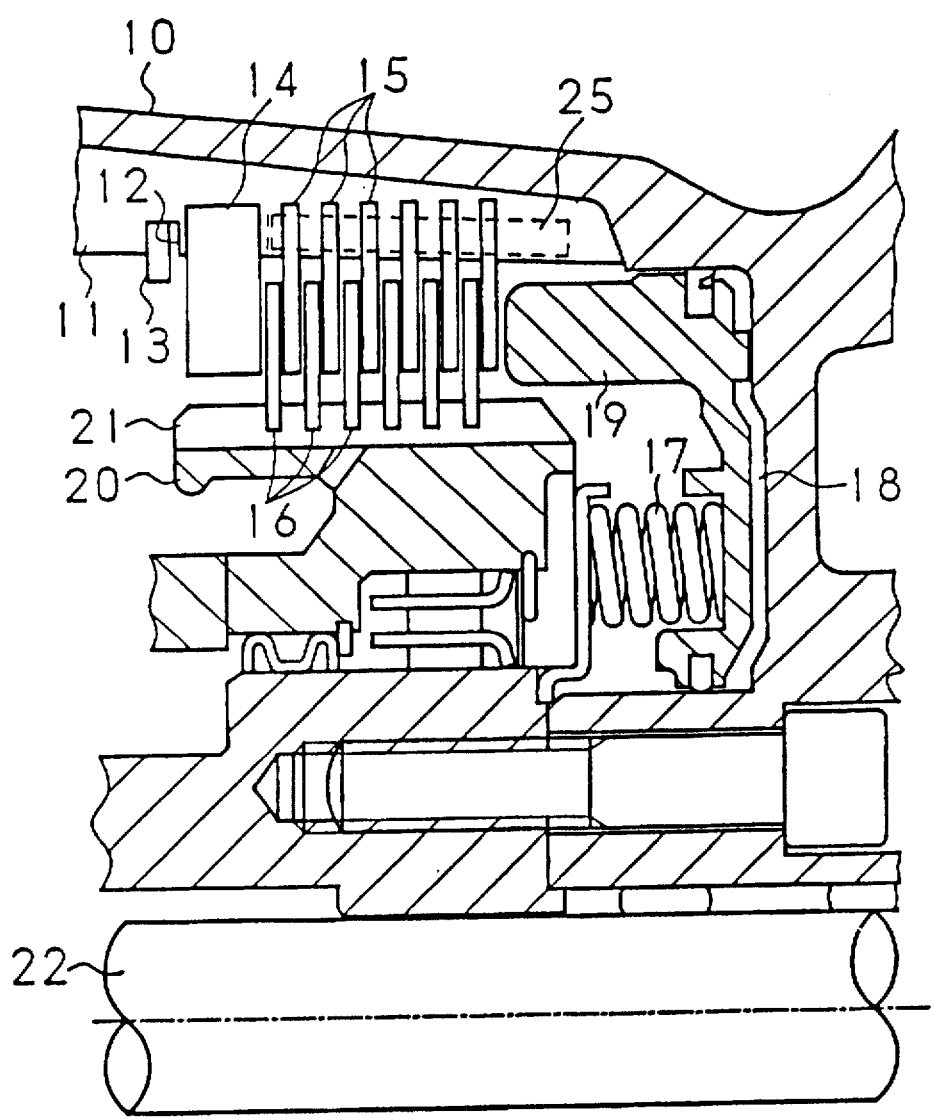
FIG. 1 is a view showing in axial cross section an automatic transmission as one embodiment of the present invention.
Figure 2:
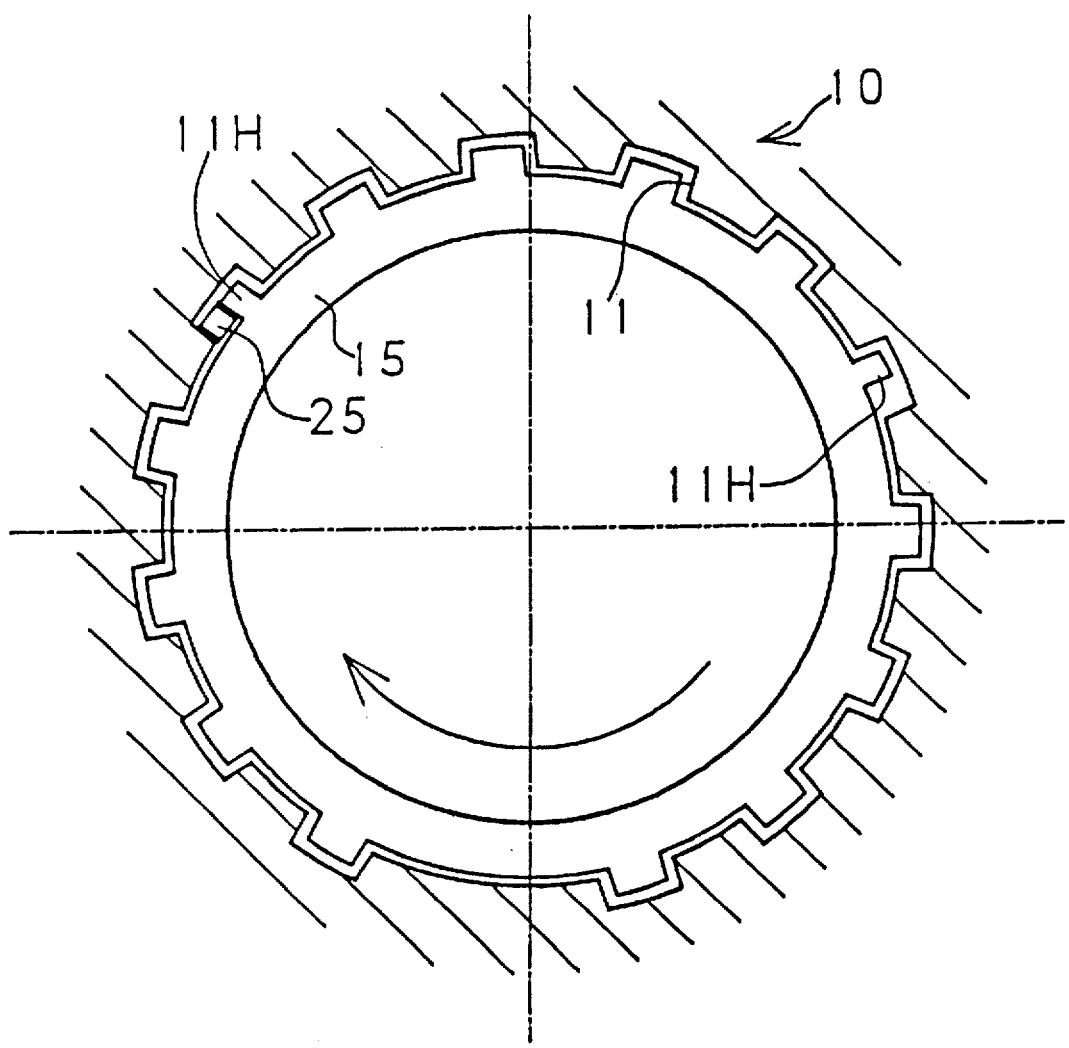
FIG. 2 is a cross sectional view showing driven plates of the automatic transmission as viewed in the axial direction.
Figure 3:
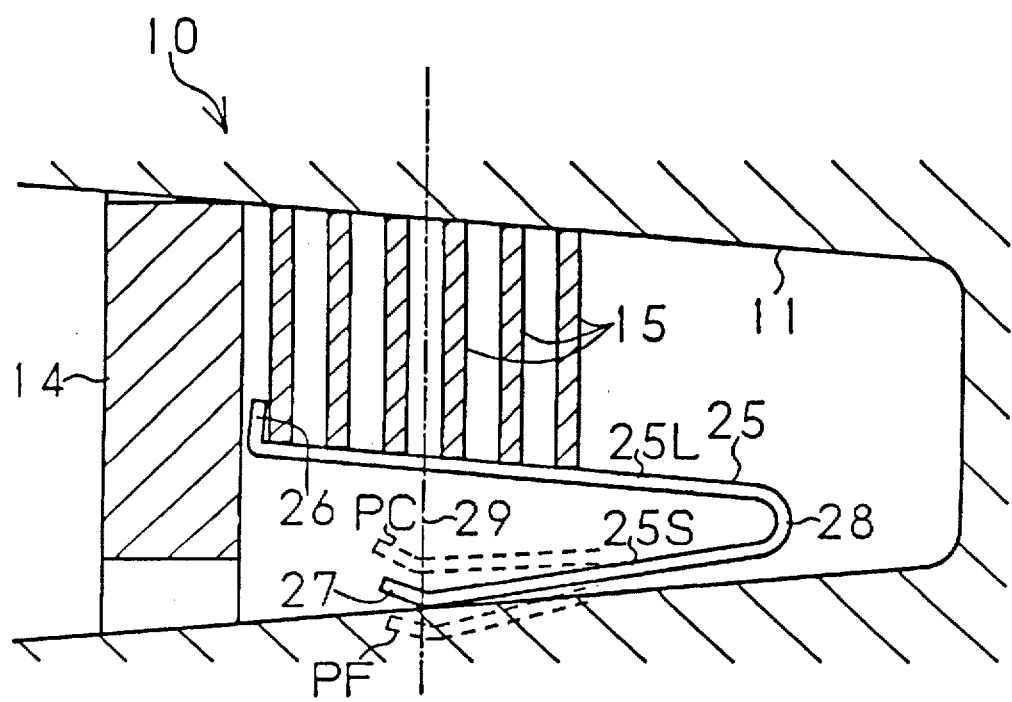
FIG. 3 is a view showing a structure for preventing vibration of the driven plates.

The invention will be described in greater detail with reference to certain preferred embodiments thereof and the accompanying drawings, wherein:

FIG. 1 is a view showing in axial cross section a preferred embodiment of an engaging apparatus of the present invention, more particularly, an automatic transmission including a multiple-plate type brake. FIG. 2 is a cross sectional view showing one of driven plates of the multiple-plate type brake as viewed in the axial direction of the apparatus, and FIG. 3 is a view explaining a structure for preventing vibration of the driven plates. In the present embodiment, the multi-plate type brake disposed in the innermost part of a transmission case of the automatic transmission is provided with the structure for preventing vibration of friction plates.

As shown in FIG. 1, a spline 11 is formed inside a transmission case 10. The transmission case 10 including the spline 11 is produced by die casting as an integral body, such that the lines of the spline 11 is tapered in the axial direction, as shown in FIG. 3. While the inner circumferential surface of the case 10 defining the tops of the spline 11 is cut after the casting, the other walls of the spline 11 remain as they are when formed by casting.

A snap ring 13 fitted into a snap ring groove 12 formed in the spline 11 serves to restrict axial movements of a retaining plate 14. The retaining plate 14 and driven plates (friction plates) 15 are formed at their outer peripheries with teeth that engage with the spline 11 so as to inhibit these plates 14, 15 from rotating relative to the transmission case 10 in the circumferential direction, while allowing the plates 14, 15 to move along the spline 11 in the axial direction.

Drive plates 16 alternately superposed on the driven plates 15 are formed at their inner peripheries with teeth that engage with spline 21 of a rotary member 20, so as to allow the drive plates 16 to rotate as a unit with the rotary member 20 and also move along the spline 21 in the axial direction. The rotary member 20 is rotatable relative to the transmission case 10, about a center axis in common with an output shaft 22 of the automatic transmission. Other portions of a gear change mechanism of the transmission which are not shown in FIG. 1 are located on the left-hand side (in FIG. 1) of the rotary member 20.

A mechanism for hydraulically driving the brake is located in the innermost portion of the transmission case 10.

With an oil pressure applied to a cylinder chamber 18, a piston 19 that is normally biased inwards by a return spring 17 moves in the axial direction towards the driven plates 15 against the bias force of the return spring 17. The piston 19 cooperates with the retaining plate 14 to sandwich therebetween the driven plates 15 and drive plates 16 as they are superposed on each other, so as to generate frictional force between the driven plates 15 and the drive plates 16, thereby to inhibit the rotary member 20 from rotating.

A spring member 25 is disposed between circumferentially opposed faces of the spline 11 and the driven plates 15. The spring member 25 has a structure as shown in FIG. 3, and located at an angular position as shown in FIG. 2. After the teeth of the driven plates 15 with the drive plates 16 alternately superposed thereon are inserted in the spline 11, and before the retaining plate 14 is set, the spring member 25 is inserted between the circumferentially opposed faces of the spline 11 and the corresponding teeth of the driven plates 15.

As shown in FIG. 2, the spring member 25 is provided between one of 28 side faces of the teeth of the driven plates 15 and one of the teeth of the spline 11 of the transmission case 10 which faces the above-indicated one side face in the circumferential direction. The drive plates 16 that are not shown in FIG. 2 are rotated in the direction as indicated by an arrow in FIG. 2.

In the absence of the spring member 25, the drive plates 16 bring up left-side portions (in FIG. 2) of the driven plates 15 to cause collision between the circumferentially opposed faces of the plates 15 and the spline 11, and then drop the driven plates 15 as a result of gravity, thereby to cause collision between the opposite side faces of the teeth of the plates 15 and the corresponding faces of the spline 11. These movements of the driven plates 15 relative to the spline 11 (transmission case 10) are repeated with a result of noises. With the spring member 25 provided in the upper, left portion of FIG. 2, the driven plates 15 are biased in the circumferential direction such that their side faces remote from the spring member 25 are held in close contact with the corresponding face of the spline 11, thus leaving no tolerance or room for allowing vertical vibrations of the left-side portions of the driven plates.

Since a plurality of driven plates 15 are biased by the same, single spring member 25, clearances are more or less left between some of the drive plates 15 and the inner wall of the spline 11. In the present embodiment, however, the spring member 25 restricts circumferential movements of the driven plates 15, and therefore leaves relatively small room for vibrations and reduces collision force of the driven plates 15, as compared with the case where the spring member 25 is not provided, thereby eliminating noises leaking outside the transmission case 10.

In a driving condition in which the drive force of the engine is transmitted to the wheels through the automatic transmission, the driven plates 15 are displaced by a certain angle in the direction of the arrow in FIG. 2, so that the side faces of the teeth of the plates 15 remote from the spring member 25 come into close contact with the corresponding side walls of the spline 11.

In an engine brake condition in which an engine brake torque is transmitted from the wheels to the engine through the automatic transmission, on the other hand, the driven plates 15 are displaced by a certain angle in the direction opposite to that of the arrow in FIG. 2, so that the side faces of the teeth of the plates 15 on the side of the spring member 25 come into close contact with the corresponding side walls of the spline 11. In this condition, the spring member 25 is sandwiched between the driven plates 15 and the corresponding spline 11, and thus compressed in the circumferential direction. In this regard, the teeth 11H of the driven plates 15 located at the angular position at which the spring member 25 is provided has a width that is smaller by about 40% than that of the other teeth of the plates 15, to ensure a relatively large clearance in the circumferential direction. Accordingly, the spring member 25 does not undergo excessively large compressive deformation due to abutting contact between the other teeth of the driven plates 15 and the side walls of the spline 11. The driven plates 15 are further formed with relatively short teeth 11H at an angular position thereof that is symmetrical with the above-indicated teeth 11H abutting on the spring member 25, with respect to a symmetry axis of the plates 15. These teeth 11H formed in the symmetrical position ensure a space in which the spring member 25 is to be inserted when the driven plates 15 are mounted in the reverse direction, thus avoiding mistakes in mounting the driven plates 15.

As shown in FIG. 3, the spring member 25 is formed by bending a spring steel plate to assume the shape of the letter "J" turned on its side. Namely, the spring member 25 has a long side 25L supporting edges of the teeth of the plural driven plates 15, and a short side 25S having an end portion 27 that abuts on the inner surface of the transmission case 10 defining the relevant spline 11. Since the driven plates 15 are supported by the plane of the long side 25L while the end portion 27 of the short side 25S abuts at a point or along a line on the side wall of the spline 11, the spring member 25 can control or adjust its posture by itself to conform to the circumferential length of the driven plates 15, so that the side faces of the teeth of the plates 15 remote from the spring member 25 are held in close contact with the corresponding side wall of the spline 11 with no clearance left in the circumferential direction. Further, the end portion 27 of the short side 25S abuts on the spline 11 (transmission case 10) at the center of support 29 where the driven plates 15 are evenly biased by the long side 25L. In this arrangement, approximately uniform bias force is applied to the driven plates 15 irrespective of inclination of the side wall of the spline 11 against which the plates 15 are biased.

The long side 25L of the spring member 25 extends over a far larger length than a portion thereof supporting the driven plates 15, and a bent portion 28 at which the spring member 25 is bent when it is mounted is located on the axially inner side of the spline 11 remote from the portion supporting the driven plates 15. Accordingly, the open angle formed by the long side 25L and the short side 25S of the spring member 25 varies to a small extent when the spring member 25 expands and contracts in the circumferential direction. Thus, the open angle is kept larger than an angle of inclination of the walls of the spline 11 even when the spring member 25 is contracted, whereby all of the driven plates 15 are kept biased with substantially uniform bias force, with reduced stress applied to the bending portion 28 of the spring member 25.

The bias force of the spring member 25 is set to a minimum level required for preventing vibration of the driven plates 15, so as not to disturb axial movements of the driven plates 15 and not to incline the driven plates 15 to such an extent that causes interference with the drive plates 16.

A stopper 26 formed by erecting squarely an end portion of the long side 25L of the spring member 25 is located in a space (the size of which corresponds to the thickness of the drive plate 16) between the retaining plate 14 and the driven plate 15, so as to position the spring member 25 in the axial direction. The spring member 25 is mounted while being contracted to the circumferential length as shown in FIG. 3, from its free state PF (as indicated by dashed line in FIG. 3) before it is inserted into the spline 11. With the engine brake applied, the spring member 25 is deformed into its contracted state PC as indicated by dashed line in FIG. 3.

Since the width of the teeth of the driven plates 15 is reduced at the position where the spring member 25 is mounted, as shown in FIG. 2, the design freedom of the spring member 25 is increased, and the diameter of the arc formed by the bent portion 28 can be increased so as to reduce burdens exerted on the bent portion 28 upon expanding and contracting of the spring member 25. With the spline 11 having a sufficiently large width, the stopper 26 abuts on the retaining plate 14, thereby preventing the spring member 25 from popping out toward the retaining plate 14.

The end portion 27 of the short side 25S of the spring member 25 is bent inwards to thus form a curved surface on the outer side of the member 25. With this curved surface abutting on the side wall of the spline 11, the edge of the end portion 27 does not contact the wall surface of the spline 11, thus avoiding wear of the wall of the spline 11 due to repeated expansion and contraction of the spring member 25.

In the structure of the present embodiment for preventing the vibration of the driven plates, the driven plates 15 are biased by the spring member 25 in the same direction in which these plates 15 are dragged along with the drive plates 16. Thus, all of the opposed faces of the plural driving plates 15 and the spline 11 are kept in contact with each other, leaving no room for causing vibrations of the driven plates 15. Accordingly, no noise arises from the automatic transmission due to the vibration of the driven plates 15.

With the spring member 25 biasing the driven plates 15 in the circumferential direction, the driven plates 15 are off-centered with respect to the center shaft by a smaller degree as compared with the case where these plates 15 are biased in the radial direction. Even if clearances between the driven plates 15 and the spline 11 in the radial direction vary to a great extent from portion to portion, the load applied to the teeth of the driven plates 15 received in the spline 11 is constant over the entire circumference of the plates 15, causing no damage of the driven plates 15 due to a variation in the load applied thereto.

Accordingly, the driven plates 15 are free from vibrations and damages even if the plates 15 are loosely supported in the spline 11 that are formed merely by die-casting with poor accuracy, or if the driven plates 15 arranged in the axial direction have the same dimensions irrespective of the tapered walls of the spline 11.

The spring member 25 having a simple shape can be manufactured at a low cost and easily mounted. Further, parts of a conventional automatic transmission, such as a transmission case, can be used without being modified except for the teeth 11H of the driven plates 15, so as to provide a quiet, highly reliable automatic transmission at a low cost.

While the present embodiment is directed to a structure for preventing vibration of friction plates in a multiple-plate brake of an automatic transmission, the present invention is also applicable to a multiple-disk clutch of an automatic transmission in which a similar spring is mounted so as to eliminate rattling of the disks in the circumferential direction.

FIGS. 4A and 4B show a modified example of spring member in which the spring member is formed by a wire rod, and FIGS. 5A and 5B show a modified example of spring member in which a bent portion of the spring member is received in a groove formed in the spline, so as to position the spring member in the axial direction. FIGS. 6A and 6B show a modified example of spring member in which its distal portion supporting the driven plates branches off into a plurality of sections each supporting two of the driven plates.

In the modified examples as shown in FIGS. 4A and 4B, the wire rod made of a spring steel is bent or folded to form the spring member 31, which has a short side whose distal end portion is received in a hole 11A formed in the spline 11, so as to position the spring member 31.

In the modified example as shown in FIGS. 5A and 5B, a circle with a sufficiently large diameter defines the bent portion of the spring member 32, while a spacing between the both sides of the bent portion is set to be relatively small. The spring member 32 thus formed can be mounted even when the driven plates 15 are opposed to the side wall of the spline with a small spacing left therebetween in the circumferential direction. The bent portion of the spring member 32 is received in the groove 11B formed in the spline 11 so that the spring member 32 is inhibited from moving in the axial direction.

In the modified example as shown in FIGS. 6A and 6B, one side of the spring member 33 which does not contact the driven plates 15 is held in contact at its plane with the side wall of the spline 11. This means that the spring member 33 does not have a function of controlling its posture by itself in accordance with the movements of the driven plates 15 like the above-described spring member 25. In view of this, the other side of the spring member 33 contacting the driven plates 15 is divided along its length into three branches, each of which serves to bias two of the driven plates 15 respectively. With the spring member 33 thus formed, no clearance (no room for vibrations) will exist between the opposed faces of a part of the driven plates 15 and the spring member 33 even with a variation in the circumferential length among the driven plates 15 or inclination of the side wall (abutting the driven plates 15) of the spline 11 in the axial direction. The above-described modified examples yield the same effect of preventing the vibration of the driven plates 15 as provided by the illustrated embodiment.

What is claimed is:

1. An engaging apparatus comprising:
    outer support member and inner support member having first and second splines, respectively, that are opposed to each other in a radial direction thereof, said outer and inner support members being rotatable relative to each other;
    a plurality of outer friction plates engaging with said first spline of said outer support member;
    a plurality of inner friction plates alternately superposed on said plurality of outer friction plates and engaging with said second spline of said inner support member;
    a hydraulic piston mechanism for compressing a stack of said outer and inner friction plates that are superposed on each other; and
    a spring member inserted between circumferentially opposed faces of a driven set of said outer and inner friction plates and a spline of a corresponding one of said outer and inner support members, said driven set of said outer and inner friction plates being driven by the other set of the outer and inner friction plates, said spring member extending through at least one entire set of driven friction plates and being formed by bending an elastic material at an axially intermediate point thereof with a circumferential spacing left between both sides of a bent portion thereof, for biasing said driven set of said outer and inner friction plates in one circumferential direction thereof.

2. An engaging apparatus as defined in claim 1, wherein said bent portion of said spring member is located on an inner side of said spline of a corresponding support member toward which the spring member is inserted.

3. An engaging apparatus as defined in claim 2, wherein said spring member has a support portion that abuts on said driven set of said outer and inner friction plates while the outer and inner friction plates are unengaged with each other, said bent portion being located on the inner side of the spline of the corresponding support member with respect to said supporting portion as viewed in the axial direction.

4. An engaging apparatus as defined in claim 1, wherein said both sides of said bent portion of said spring member comprises a long side against which said driven set of the outer and inner friction plates are pressed, and a short side having an end portion supported by a side wall of said spline of the corresponding support member which faces said short side, said long side and said short side forming an angle larger than zero degree when the spring member is in a free state.

5. An engaging apparatus as defined in claim 4, wherein said end portion of said short side of said spring member is bent inwards so as to form a curved surface that protrudes outwards.

6. An engaging apparatus as defined in claim 4, wherein a length of said short side of said spring member is determined such that the short side terminates at a point that is approximately aligned in the circumferential direction with an axially middle portion of a region of said long side, which region supports said driven set of said outer and inner friction plates abutting thereon while the outer and inner friction plates are unengaged with each other.

7. An engaging apparatus as defined in claim 4, wherein each of said driven set of said outer and inner friction plates is formed with teeth one of which has a smaller circumferential dimension than the other teeth, such that an axial space is formed between said one tooth of said each friction plate and said spline of the corresponding support member, said spring member being disposed in said axial space.

8. An engaging apparatus as defined in claim 7, wherein said hydraulic piston mechanism includes a retaining plate that is inhibited from moving relative to said spline of said corresponding support member in the axial direction so as to receive compressive force applied to said stack of the outer and inner friction plates, and wherein said long side of said spring member has a distal end portion that is bent substantially squarely to protrude outwards, said distal end portion being located between said retaining plate and an opposed one of said driven set of the friction plates.

9. An engaging apparatus as defined in claim 4, wherein at least one of said driven set of the outer and inner friction plates and said selected spline of the corresponding support member is retracted in the circumferential direction so as to form a space for accommodating said spring member, said spring member being disposed in said space, an amount of retraction of said at least one of the friction plates and the selected spline being determined to be not smaller than a radius of a circle defining said bent portion of the spring member.

* * * * *